US012654878B2

(12) United States Patent
Merritt et al.

(10) Patent No.: US 12,654,878 B2
(45) Date of Patent: Jun. 16, 2026

(54) METAL PLATING RETENTION ON ADDITIVELY MANUFACTURE PLASTIC PARTS FOR AN AIRCRAFT

(71) Applicant: Hamilton Sundstrand Corporation, Charlotte, NC (US)

(72) Inventors: Brent J. Merritt, Southwick, MA (US); Viktor Kilchyk, Lancaster, NY (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/357,557

(22) Filed: Jul. 24, 2023

(65) Prior Publication Data

US 2025/0033796 A1 Jan. 30, 2025

(51) Int. Cl.
| | |
|---|---|
| *B29C 64/118* | (2017.01) |
| *B33Y 10/00* | (2015.01) |
| *B33Y 80/00* | (2015.01) |
| *B64F 5/10* | (2017.01) |
| *C25D 9/04* | (2006.01) |

(52) U.S. Cl.
CPC ............. *B64F 5/10* (2017.01); *B29C 64/118* (2017.08); *C25D 9/04* (2013.01); *B33Y 10/00* (2014.12); *B33Y 80/00* (2014.12)

(58) Field of Classification Search
CPC .......... B64F 5/10; B33Y 10/00; B29C 64/118
See application file for complete search history.

(56) References Cited

U.S. PATENT DOCUMENTS

| | | | |
|---|---|---|---|
| 3,326,726 | A | 6/1967 | Bassett, Jr. et al. |
| 3,513,881 | A | 5/1970 | Kinsell |
| 3,687,365 | A | 8/1972 | Laessig |
| 4,327,154 | A | 4/1982 | Rossmann |
| 4,418,549 | A | 12/1983 | Courneya |
| 4,441,653 | A | 4/1984 | Grudich |
| 4,454,983 | A | 6/1984 | Tarvis, Jr. |

(Continued)

FOREIGN PATENT DOCUMENTS

| | | |
|---|---|---|
| CN | 114423927 A | 4/2022 |
| DE | 10250758 A1 | 5/2004 |

(Continued)

OTHER PUBLICATIONS

Zhan et al. Metal-plastic hybrid 3D printing using catalyst-loaded filament and electroless plating, Additive Manufacturing, vol. 26, Dec. 2020, 101556. (Year: 2020).*

(Continued)

*Primary Examiner* — Kelly M Gambetta
(74) *Attorney, Agent, or Firm* — CANTOR COLBURN LLP

(57) ABSTRACT

A method of additively manufacturing an aircraft part, having steps of: forming a base, defining a shape of the aircraft part, out of first thermoplastic polymer; forming a lower support surface onto discrete locations of the base by printing a mixture of a second thermoplastic polymer and a catalyst compound formed with metal onto the discrete locations, such that the lower support surface is formed with cavities; and forming an upper support surface by depositing, via electrolysis deposition, a metal plating onto the lower support surface along the discrete locations, to thereby form the aircraft part.

8 Claims, 3 Drawing Sheets

(56) References Cited

U.S. PATENT DOCUMENTS

| | | |
|---|---|---|
| 4,851,285 A | 7/1989 | Brotz |
| 4,939,038 A | 7/1990 | Inabata |
| 5,230,850 A | 7/1993 | Lewis |
| 5,634,189 A | 5/1997 | Rossmann et al. |
| 5,720,339 A | 2/1998 | Glass et al. |
| 5,769,389 A | 6/1998 | Jacobsen et al. |
| 6,100,463 A | 8/2000 | Ladd et al. |
| 6,161,382 A | 12/2000 | Brotz |
| 6,182,929 B1 | 2/2001 | Martin et al. |
| 6,371,437 B1 | 4/2002 | Kenny et al. |
| 7,037,076 B2 | 5/2006 | Jacot et al. |
| 7,147,269 B2 | 12/2006 | Aase et al. |
| 7,650,910 B2 | 1/2010 | Welle |
| 7,686,040 B2 | 3/2010 | Welle |
| 7,721,762 B2 | 5/2010 | Welle |
| 7,753,654 B2 | 7/2010 | Read |
| 7,770,959 B2 | 8/2010 | Browne et al. |
| 7,854,467 B2 | 12/2010 | McKnight et al. |
| 7,922,456 B2 | 4/2011 | McMillan |
| 7,967,568 B2 | 6/2011 | Dalton et al. |
| 8,119,206 B2 | 2/2012 | Hougham et al. |
| 8,205,668 B2 | 6/2012 | Freese |
| 9,181,933 B2 | 11/2015 | Daly et al. |
| 9,719,536 B2 | 8/2017 | Ashmawi et al. |
| 9,752,442 B2 | 9/2017 | Hayford et al. |
| 9,784,126 B2 | 10/2017 | Army et al. |
| 9,897,078 B2 | 2/2018 | Nicholson et al. |
| 9,919,470 B2 | 3/2018 | Behl et al. |
| 9,981,421 B2 | 5/2018 | Marcoe et al. |
| 10,053,239 B2 | 8/2018 | Mabe et al. |
| 10,543,897 B2 | 1/2020 | Brown et al. |
| 10,731,666 B2 | 8/2020 | Skertic |
| 10,815,976 B2 | 10/2020 | Kaneko et al. |
| 10,976,119 B2 | 4/2021 | Veto et al. |
| 10,982,783 B2 | 4/2021 | Srinivasa Murthy |
| 11,008,943 B2 | 5/2021 | Tajiri et al. |
| 11,110,647 B2 | 9/2021 | Marcoe et al. |
| 11,167,836 B2 | 11/2021 | Hethcock, Jr. |
| 11,192,333 B2 | 12/2021 | Hahnlen |
| 11,248,592 B1 | 2/2022 | Tsuruta et al. |
| 11,268,520 B2 | 3/2022 | Melo et al. |
| 11,359,287 B2 | 6/2022 | Philibert |
| 11,655,346 B2 | 5/2023 | Jackson et al. |
| 11,668,316 B1 | 6/2023 | Kilchyk et al. |
| 12,162,606 B1 | 12/2024 | Merritt et al. |
| 12,384,515 B2 | 8/2025 | Kilchyk et al. |
| 2001/0008357 A1 | 7/2001 | Dhuler et al. |
| 2003/0025093 A1 | 2/2003 | Kenny et al. |
| 2005/0005983 A1 | 1/2005 | Lewis |
| 2007/0140862 A1 | 6/2007 | McMillan |
| 2007/0171257 A1 | 7/2007 | Yang |
| 2007/0184238 A1 | 8/2007 | Hockaday et al. |
| 2008/0196430 A1 | 8/2008 | Mcgill et al. |
| 2008/0236668 A1 | 10/2008 | Beerling et al. |
| 2008/0302024 A1 | 12/2008 | Browne et al. |
| 2010/0028205 A1 | 2/2010 | Ponjee et al. |
| 2010/0304063 A1 | 12/2010 | Mccrea et al. |
| 2011/0284645 A1 | 11/2011 | Tiliakos et al. |
| 2012/0255278 A1 | 10/2012 | Miao et al. |
| 2013/0048135 A1 | 2/2013 | Blumenthal et al. |
| 2013/0255796 A1 | 10/2013 | Dimascio et al. |
| 2013/0255815 A1 | 10/2013 | Brinkmann et al. |
| 2013/0287555 A1 | 10/2013 | Rosen et al. |
| 2014/0186161 A1 | 7/2014 | Colson et al. |
| 2015/0033730 A1 | 2/2015 | Beers et al. |
| 2015/0239046 A1 | 8/2015 | Mcmahan et al. |
| 2016/0025078 A1 | 1/2016 | Li et al. |
| 2016/0160353 A1 | 6/2016 | Miarecki et al. |
| 2016/0160869 A1 | 6/2016 | Roach et al. |
| 2016/0186575 A1 | 6/2016 | Lacy et al. |
| 2017/0001263 A1 | 1/2017 | Steiner |
| 2017/0227019 A1 | 8/2017 | Chen et al. |
| 2018/0038513 A1 | 2/2018 | Baldea et al. |
| 2018/0043660 A1 | 2/2018 | Kang et al. |
| 2018/0058429 A1 | 3/2018 | Kwon et al. |

| | | |
|---|---|---|
| 2019/0203039 A1 | 7/2019 | Seo et al. |
| 2019/0210111 A1 | 7/2019 | Army et al. |
| 2020/0009826 A1 | 1/2020 | Brown et al. |
| 2020/0316684 A1 | 10/2020 | Shuck |
| 2021/0020263 A1 | 1/2021 | Pasini et al. |
| 2021/0071020 A1 | 3/2021 | Hu |
| 2021/0085856 A1 | 3/2021 | Ding |
| 2021/0229350 A1 | 7/2021 | Chaffins et al. |
| 2021/0238748 A1 | 8/2021 | Andreatta |
| 2021/0277937 A1 | 9/2021 | Elbibary et al. |
| 2021/0372286 A1 | 12/2021 | Chakrabarti et al. |
| 2022/0034592 A1 | 2/2022 | Maynard et al. |
| 2022/0089799 A1* | 3/2022 | Wang ............... C08F 220/1808 |
| 2023/0080512 A1 | 3/2023 | Merritt et al. |
| 2023/0085189 A1 | 3/2023 | Merritt et al. |
| 2023/0142146 A1 | 5/2023 | Kilchyk |
| 2023/0227680 A1 | 7/2023 | Hu |
| 2023/0304506 A1 | 9/2023 | Kilchyk et al. |
| 2025/0033270 A1 | 1/2025 | Merritt et al. |
| 2025/0033271 A1 | 1/2025 | Merritt et al. |
| 2025/0033272 A1 | 1/2025 | Merritt et al. |
| 2025/0033282 A1 | 1/2025 | Merritt et al. |
| 2025/0033283 A1 | 1/2025 | Merritt et al. |
| 2025/0083795 A1 | 3/2025 | Kilchyk et al. |
| 2025/0084766 A1 | 3/2025 | Kilchyk et al. |
| 2025/0084833 A1 | 3/2025 | Kilchyk et al. |
| 2025/0084834 A1 | 3/2025 | Kilchyk et al. |
| 2025/0084859 A1 | 3/2025 | Kilchyk et al. |
| 2025/0085725 A1 | 3/2025 | Kilchyk et al. |
| 2025/0088125 A1 | 3/2025 | Kilchyk et al. |
| 2025/0089567 A1 | 3/2025 | Kilchyk et al. |
| 2025/0089568 A1 | 3/2025 | Kilchyk et al. |

FOREIGN PATENT DOCUMENTS

| | | |
|---|---|---|
| DE | 102014225229 A1 | 6/2016 |
| EP | 2025777 A2 | 2/2009 |
| EP | 2974954 A1 | 1/2016 |
| EP | 2960497 B1 | 12/2016 |
| EP | 4177440 A1 | 5/2023 |
| EP | 4209681 A1 | 7/2023 |
| EP | 4219959 A2 | 8/2023 |
| EP | 4411108 A2 | 8/2024 |
| GB | 2472053 A | 1/2011 |
| JP | 2007023361 A | 2/2007 |
| JP | 2011148037 A | 8/2011 |
| JP | 2022121766 A | 8/2022 |
| KR | 20130005989 A | 1/2013 |
| WO | 2015006438 A1 | 1/2015 |
| WO | 2018108908 A1 | 6/2018 |
| WO | 2019108203 A1 | 6/2019 |
| WO | 2019162754 A1 | 8/2019 |

OTHER PUBLICATIONS

Richardson, Mike, The aerospace secret standard, Aerospace Manufacturing, Apr. 2019, https://www.aero-mag.com/the-aerospace-secret-standard accessed Jan. 31, 2025 (Year: 2019).*

European Search Report for Application No. 24188681.1, mailed Dec. 4, 2024, 10 pages.

European Search Report for Application No. 24188713.2, mailed Jan. 2, 2025, 6 pages.

Markforged "Onyx FR-A and Carbon Fiber FR-A: Aerospace-Ready Materials", markforged.com, Jul. 26, 2021, pp. 1-6.

Noughabi et al., "Detailed Design and Aerodynamic Performance Analysis of a Radial-Inflow Turbine", Applied Sciences, 2018, pp. 1-21.

Pearson et al., "Novel polyurethane elastomeric composites reinforced with alumina, aramid, and poly (p-phenylene-2, 6-benzobisoxazole) short fibers, development and characterization of the thermal and dynamic mechanical properties", Composites Part B: Engineering 122 (2017): 192-201.

Zhan et al., "Metal-plastic hybrid 3D printing using catalyst-loaded filament and electroless plating", Additive Manufacturing, 2020, pp. 1-7.

(56) References Cited

OTHER PUBLICATIONS

Zhiguo et al., "Determination of thermal expansion coefficients for unidirectional fiber-reinforced composites", Chinese Journal of Aeronautics, 2014, pp. 1-14.

European Search Report for Application No. 224188681.1, mailed Dec. 4, 2024, 10 pages.

European Search Report for Application No. 24188696.9, mailed Dec. 16, 2024, 8 pages.

European Search Report for Application No. 24188714.0, mailed Dec. 13, 2024, 10 pages.

European Search Report for Application No. 24196227.3, mailed Oct. 31, 2024, 10 pages.

European Search Report for Application No. 24196233.1, mailed Oct. 31, 2024, 10 pages.

European Search Report for Application No. 24198989.6, mailed Nov. 4, 2024, 11 pages.

Kim, Daejong, "Parametric Studies on Static and Dynamic Performance of Air Foil Bearings with Different Top Foil Geometries and Bump Stiffness Distributions", https://doi.org/10.1115/1.2540065; Published Online: Nov. 15, 2006, 9 pages.

Lim, Teik-Cheng "Metamaterial with sign-toggling thermal expansivity inspired by Islamic motifs in Spain", Journal of Science: Advanced Materials and Devices, vol. 7, No. 1, Mar. 2022, 6 pages.

Micalizz, et al., "Shape-memory actuators manufacturing by dual extrusion multimaterial 3d printing of conductive and non-conductive filaments", Smart Mater. Struct. 28, 2019, pp. 1-13.

Schmiedeke, et al. "Experimental Investigation of Two Switching States of an Active Foil Bearing during Start-Up", Machines 2022, Published Jun. 6, 2022, 18 pages.

Wei, et al., "An overview of laser-based multiple metallic material additive manufacturing: from macro-to micro-scales", International Journal of Extrem. Manuf. 3 (2021), pp. 1-33.

Extended European Search Report for EP Application No. 24182403.6, dated Jun. 2, 2025, pp. 1-11.

Extended European Search Report for EP Application No. 24196240.6, dated Apr. 28, 2025, pp. 1-13.

Giani et al., "Towards sustainability in 3D printing of thermoplastic composites: Evaluation of recycled carbon fibers as reinforcing agent for FDM filament production and 3D printing", Composites: Part A 159, 2002, pp. 1-12.

Lazarus et al., "Direct electroless plating of conductive thermoplastics for selective metallization of 3D printed parts", Additive Manufacturing, vol. 55, Mar. 30, 2022, pp. 1-11.

Tammaro et al., "Reinforcing Efficiency of Recycled Carbon Fiber PLA Filament Suitable for Additive Manufacturing", Polymers 2024, pp. 1-17.

Doering et al., "Micromachined thermoelectrically driven cantilever structures for fluid jet deflection" [1992] Proceedings IEEE Micro Electro Mechanical Systems. IEEE, (Feb. 1992) pp. 12-18.

European Search Report for Application No. 24190738.5, mailed Jan. 13, 2025, 8 pages.

European Search Report for Application No. 24196219.0, mailed Jan. 13, 2025, 8 pages.

European Search Report for Application No. 24196295.0, mailed Jan. 29, 2025, 16 pages.

European Search Report for Application No. 24196309.9, mailed Jan. 28, 2025, 10 pages.

European Search Report for Application No. 24199023.3, mailed Feb. 21, 2025, 15 pages.

European Search Report for Application No. 24199038.1, mailed Jan. 31, 2025, 8 pages.

European Search Report for Application No. 24199041.5, mailed Jan. 28, 2025, 8 pages.

Jerman "Electrically-activated, micromachined diaphragm valves" IEEE 4th Technical Digest on Solid-State Sensor and Actuator Workshop, Hilton Head, SC, USA, (Jun. 1990) pp. 65-69.

Jerman et al., "Electrically activated normally closed diaphragm valves" Journal of Micromechanics and Microengineering 4.4 (Dec. 1994) pp. 210-216.

Partial European Search Report for Application No. 24196240.6, mailed Feb. 7, 2025, 16 pages.

Hao et al., "A Review of Smart Materials for the Boost of Soft Actuators, Soft Sensors, and Robotics Applications", Chinese Journal of Mechanical Engineering, 2022, pp. 1-16.

* cited by examiner

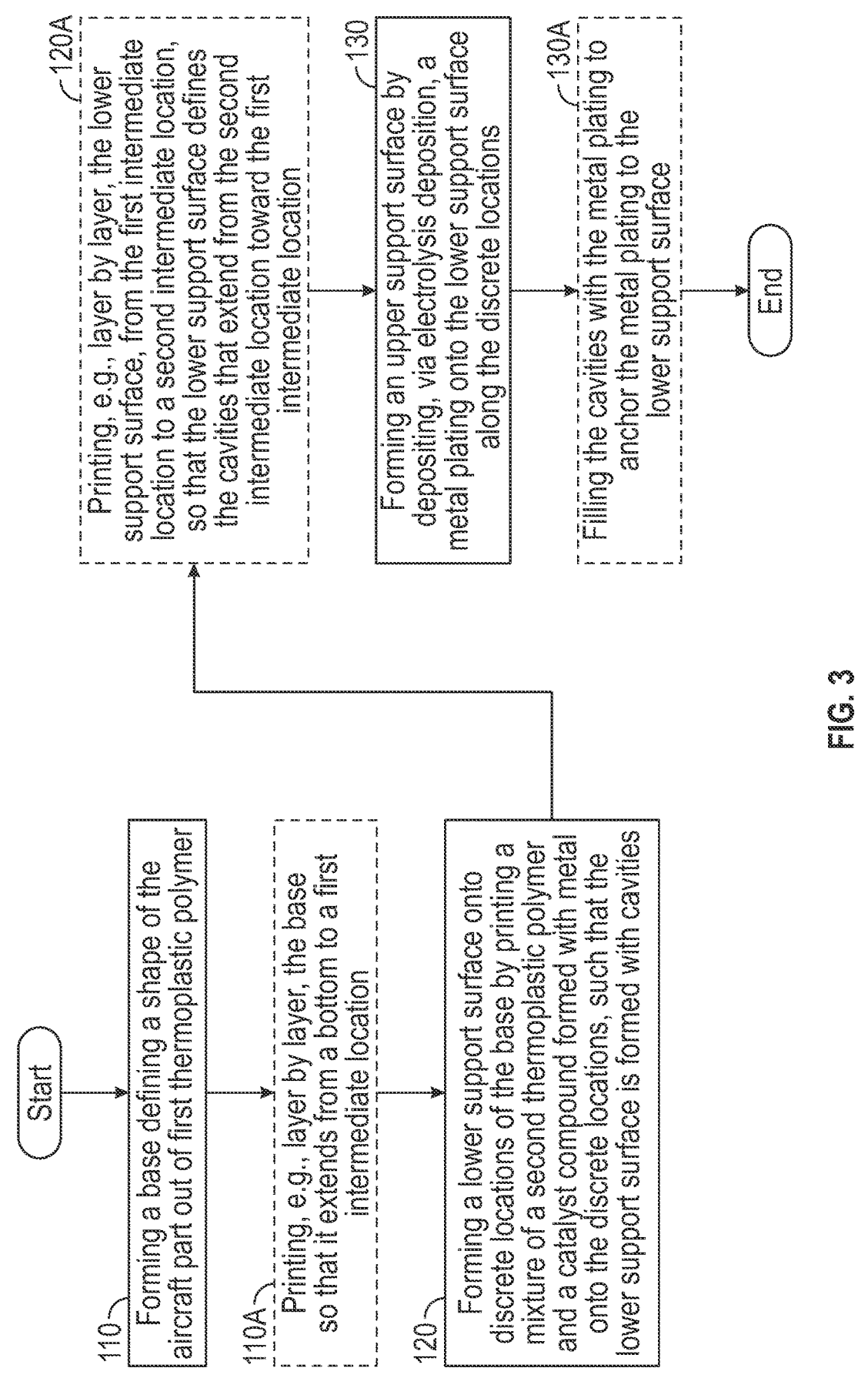

FIG. 3

Start

110 — Forming a base defining a shape of the aircraft part out of first thermoplastic polymer 110A — Printing, e.g., layer by layer, the base so that it extends from a bottom to a first intermediate location 120 — Forming a lower support surface onto discrete locations of the base by printing a mixture of a second thermoplastic polymer and a catalyst compound formed with metal onto the discrete locations, such that the lower support surface is formed with cavities 120A — Printing, e.g., layer by layer, the lower support surface, from the first intermediate location to a second intermediate location, so that the lower support surface defines the cavities that extend from the second intermediate location toward the first intermediate location 130 — Forming an upper support surface by depositing, via electrolysis deposition, a metal plating onto the lower support surface along the discrete locations 130A — Filling the cavities with the metal plating to anchor the metal plating to the lower support surface End

METAL PLATING RETENTION ON ADDITIVELY MANUFACTURE PLASTIC PARTS FOR AN AIRCRAFT

BACKGROUND

The embodiments are directed to parts for an aircraft and specifically to metal plating retention on additively manufacture plastic parts for an aircraft.

Aircraft parts using exotic materials may be expensive and heavy. Aircraft parts may be additively manufactured from plastic and coated with strengthening materials. However due to different coefficients of expansion, the different materials may separate or fail.

BRIEF DESCRIPTION

Disclosed is a method of additively manufacturing an aircraft part, including: forming a base, defining a shape of the aircraft part, out of first thermoplastic polymer; forming a lower support surface onto discrete locations of the base by printing a mixture of a second thermoplastic polymer and a catalyst compound formed with metal onto the discrete locations, such that the lower support surface is formed with cavities; and forming an upper support surface by depositing, via electrolysis deposition, a metal plating onto the lower support surface along the discrete locations, to thereby form the aircraft part.

In addition to one or more aspects of the method, or as an alternative, forming the base includes printing, layer by layer, the base so that it extends from a bottom to a first intermediate location; forming the lower support surface includes printing, layer by layer, the lower support surface, from the first intermediate location to a second intermediate location, so that the lower support surface defines the cavities that extend from the second intermediate location toward the first intermediate location; and forming the upper support surface includes filling the cavities with the metal plating to anchor the metal plating to the lower support surface.

In addition to one or more aspects of the method, or as an alternative, cavities define a neck portion extending from the second intermediate location toward the first intermediate location, and a base portion that is larger than the neck portion.

In addition to one or more aspects of the method, or as an alternative, the neck portion is cylindrical having a first long axis extending from the second intermediate location toward the first intermediate location, and the base portion is oval having a second long axis that extends perpendicularly to the first long axis.

In addition to one or more aspects of the method, or as an alternative, the first and second thermoplastic polymers are the same as each other.

In addition to one or more aspects of the method, or as an alternative, the first thermoplastic polymer is Acrylonitrile butadiene styrene (ABS).

In addition to one or more aspects of the method, or as an alternative, the catalyst is palladium (II) chloride (PdCl$_2$).

In addition to one or more aspects of the method, or as an alternative, the aircraft part is additively manufactured utilizing stereolithography (SLA).

In addition to one or more aspects of the method, or as an alternative, the aircraft part is additively manufactured utilizing fused deposition modeling (FDM).

An aircraft part made from a method having one or more of the above disclosed aspects is disclosed herein.

An air cycle machine of an aircraft having an aircraft part made from a method having one or more of the above disclosed aspects is disclosed herein.

BRIEF DESCRIPTION OF THE DRAWINGS

The following descriptions should not be considered limiting in any way. With reference to the accompanying drawings, like elements are numbered alike:

FIG. 3 is a flowchart showing a process for manufacturing an aircraft part according to an embodiment.

DETAILED DESCRIPTION

A detailed description of one or more embodiments of the disclosed apparatus and method are presented herein by way of exemplification and not limitation with reference to the Figures.

Figure 1:
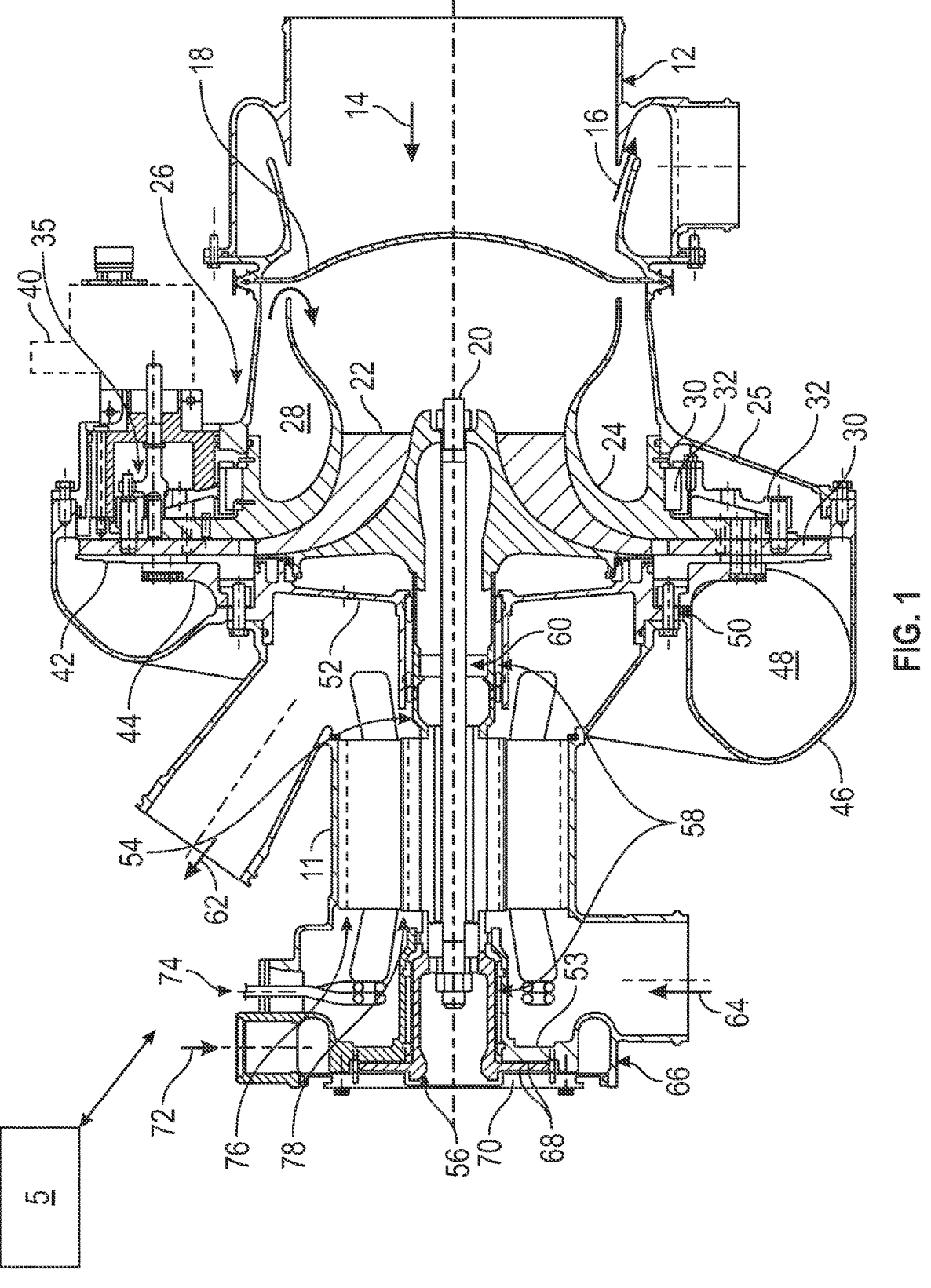
FIG. 1 shows an air cycle machine of an aircraft having parts that may be manufactured according to an embodiment.

FIG. 1 shows an air cycle machine (ACM) 10 of an aircraft 5 (shown schematically). The ACM 10 may include an outer case 11 that has an inlet housing 12 of a compressor inlet 14, and a motor cooling supply port 16. Downstream of the inlet housing 12 is a FOD screen 18. A tie rod 20 is surrounded by a compressor rotor 22. A diffusor rotor shroud (or shroud) 24 and an add heat housing 26 surround an add heat supply 28. The add heat housing 26 is connected to the outer case 11 via a forward frame member 25. Exterior to the add heat housing 26 is a backup ring 30 supporting a drive ring bearing 32. The drive ring bearing 32 is structurally coupled to a drive ring 34 and pinion 35. The ACM 10 includes a diffuser vane 36 and a variable diffusor actuator 40. Downstream of the compressor rotor 22 is an inboard plate 42 structurally coupled to a backing plate 44. An outlet housing 46 defines a compressor outlet 48. The compressor outlet 48 is secured with a bolt ring 50 to an intermediate frame member 52 of the ACM case 11. A rotor shaft 54 and aft thrust bearing shaft 56 are supported by journal bearings and a sleeve 58. The journal bearing and sleeve 58 are supported by the case 11 via, e.g., the intermediate frame member 52 and an aft frame member 53. The tie rod 20 is supported over the rotor shaft 54 by a tie rod support 60. The ACM case 11 defines a bearing and motor cooling outlet 62. A motor cooling inlet 64 is defined at an aft motor housing 66. Surrounding the thrust shaft 56 are thrust bearings 68. A thrust plate 70 is located at the aft end of the ACM 10. The aft end of the ACM 10 also defines a bearing cooling inlet 72 and includes lead wires and a cover plate 74. Between the motor cooling inlet 64 and outlet 62 is a motor stator 76 and rotor 78.

Much of the ACM 10 may be additively manufactured with a 3D printer utilizing, e.g., stereolithography (SLA) or fused deposition modeling (FDM). Specifically, components of the ACM (or aircraft parts) may be additively manufactured utilizing a thermoplastic polymer and coating the thermoplastic with a metal plating. Metal-coated plastic aircraft parts may offer many advantages to a wide range of applications. The different materials, however, may have different coefficients of thermal expansions (CTEs), so that they could undergo dissimilar rates of deformation when subject to thermal stress. The embodiments herein provide a method of manufacturing such aircraft parts such that metal plating resists separation when expanding due to the different CTEs.

Figure 2:
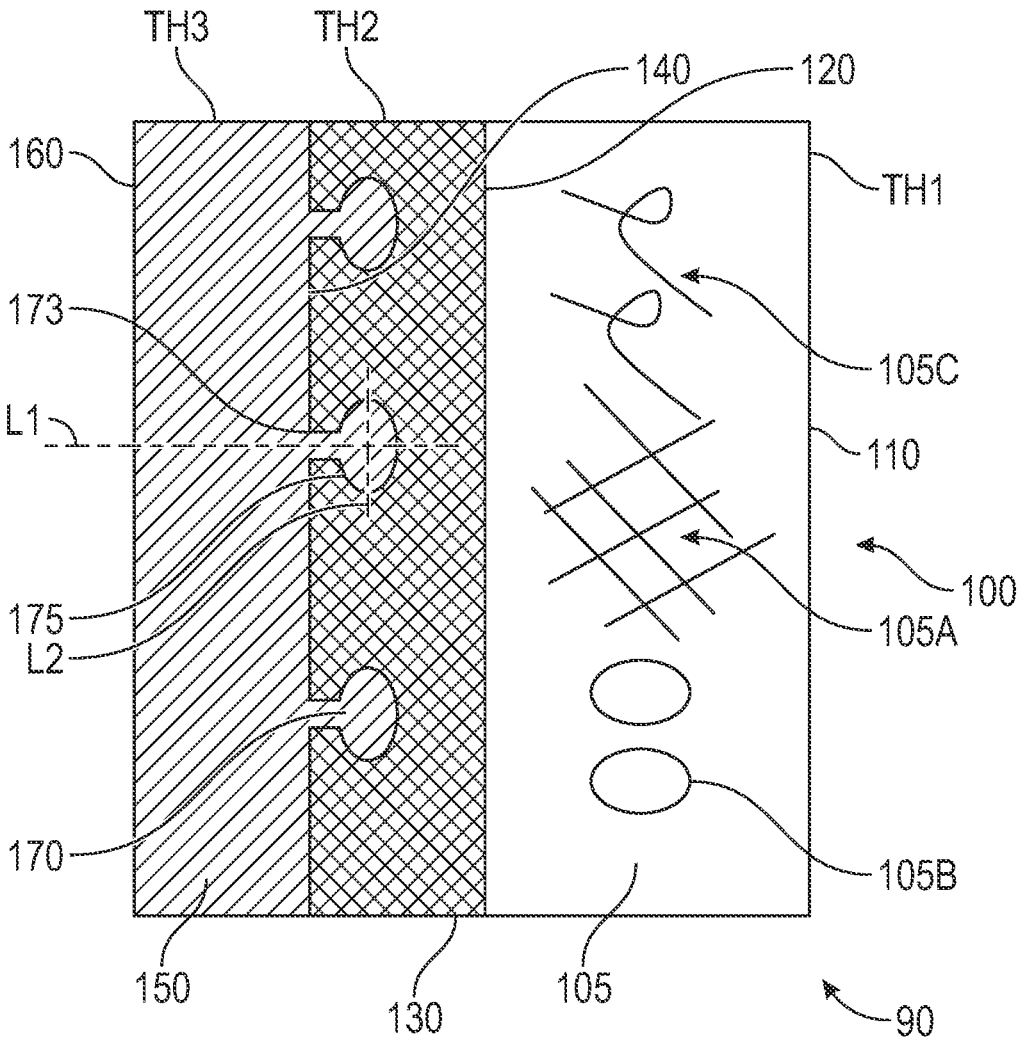
FIG. 2 shows a cross section of an aircraft part manufactured according to the embodiment.

FIG. 2 shows an example aircraft part 90 having a base 100 formed of a first thermoplastic polymer. The base 100 is built up so that it extends from a bottom 110 (or bottom face of the part) to a first intermediate location 120 (or first surface interface of the part) to define a first thickness TH1. A lower support surface 130 is deposited on top (e.g., over the first surface interface) of the base 100 and is built up so that it extends to a second intermediate location 140 (or second surface interface) to define a second thickness TH2. The base 100 may include reinforcement structures 105. The reinforcement structures 105 may be one or more of a rigid lattice structure 105A (e.g. comprised of a material that is more rigid than a rest of the base 100), voids 105B or fiber 105C reinforcements, each is shown as a non-limiting example. The illustrated combination of such reinforcements 105 is not intended on limiting the scope of the embodiments.

The lower support surface 130 is formed of a mixture of a second thermoplastic polymer and a catalyst compound formed with metal. The thermoplastic polymers identified herein may be acrylonitrile butadiene styrene (ABS). The catalyst may be palladium (II) chloride (PdCl2).

An upper support surface 150 is a metal plating formed via electrolysis deposition and is built up to define a third thickness TH3 so that it extends to a top 160 (or top face) of the part 90. The lower and upper support surfaces 130, 150 may be placed in discrete locations on the aircraft part 90, such as locations that undergo thermal stress. To ensure the metal plating of the upper support surface 150 remains connected to the rest of the aircraft part 90, the lower support surface 130 may be formed to define an array of voids or cavities 170. When the upper support surface 150 is formed onto the lower support surface 130, the metal plating will form into the cavities 170 to increase bonding strength.

The cavities 170 may define a neck portion 173 extending from the second intermediate location 140 toward the first intermediate location 120, and a base portion 175 that may be larger than the neck portion 173. The neck portion 173 may be cylindrical having a first long axis L1 extending from the second intermediate 140 location toward the first intermediate location 120. The base portion 175 may be oval having a second long axis L2 that extends perpendicularly to the first long axis L1.

Turning now to FIG. 3, a flowchart shows a method of additively manufacturing an aircraft part 90. As shown in block 100, the method includes forming the base 100 out of the first thermoplastic polymer. As shown in block 110A, forming the base 100 includes printing, e.g., layer by layer, the base 100 so that it extends from a bottom 110 to the first intermediate location 120.

As shown in block 120, the method includes forming the lower support surface 113 onto discrete locations of the base surface 110. This includes printing the mixture of the second thermoplastic polymer and the catalyst compound formed with metal onto the discrete locations. As indicated, the discrete locations are areas that experience relatively high thermal and operational stress. As shown in block 120A, forming the lower support surface 113 includes printing, e.g., layer by layer, the lower support surface 130, from the first intermediate location 120 to the second intermediate location 140. This step includes defining in the lower support surface 130 the cavities 170 that extend from the second intermediate location 140 toward the first intermediate location 120.

As shown in block 130, the method includes forming the upper support surface 150 by depositing, via electrolysis deposition, the metal plating onto the lower support surface 130 along the discrete locations of the aircraft part 90. As shown in block 130A, forming the upper support surface 150 includes filling the cavities 170 with the metal plating to anchor the plating to the lower support surface 130.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of additively manufacturing an aircraft part, comprising:
forming a base, defining a shape of the aircraft part, out of first thermoplastic polymer;
forming a lower support surface of the base onto discrete locations of the base by printing a mixture of a second thermoplastic polymer and a catalyst compound formed with metal onto the discrete locations, such that the lower support surface is formed with cavities; and
forming an upper support surface of the base by depositing, via electrolysis deposition, a metal plating onto one side of the lower support surface along the discrete locations, to thereby form the aircraft part;
forming a reinforcement structure of the base onto another side of the lower support surface, wherein the reinforcement structure defines a lattice structure having voids;
wherein the base is formed by a mixture of materials having coefficients of thermal expansion that differ from each other;
wherein:
forming the base includes printing, layer by layer, the base so that it extends from a bottom to a first intermediate location;
forming the lower support surface includes printing, layer by layer, the lower support surface, from the first intermediate location to a second intermediate location, so that the lower support surface defines the cavities that extend from the second intermediate location toward the first intermediate location; and forming the upper support surface includes filling the cavities with the metal plating to anchor the metal plating to the lower support surface, whereby the metal plating of the upper support surface resists separation from the base when expanding due to the differing coefficients of thermal expansion.

2. The method of claim 1, wherein the cavities define a neck portion extending from the second intermediate location toward the first intermediate location, and a base portion that is larger than the neck portion.

3. The method of claim 2, wherein the neck portion is cylindrical having a first long axis extending from the second intermediate location toward the first intermediate location, and the base portion is oval having a second long axis that extends perpendicularly to the first long axis.

4. The method of claim 1, wherein the first and second thermoplastic polymers are the same as each other.

5. The method of claim 3, wherein the first thermoplastic polymer is Acrylonitrile butadiene styrene (ABS).

6. The method of claim 3, wherein the catalyst is palladium (II) chloride ($PdCl_2$).

7. The method of claim 1, wherein the aircraft part is additively manufactured utilizing stereolithography (SLA).

8. The method of claim 1, wherein the aircraft part is additively manufactured utilizing fused deposition modeling (FDM).

\* \* \* \* \*